W. A. GEIGER.
SIDE BEARING FOR RAILWAY CARS.
APPLICATION FILED OCT. 22, 1914. RENEWED NOV. 18, 1916.
1,387,254.                                    Patented Aug. 9, 1921.
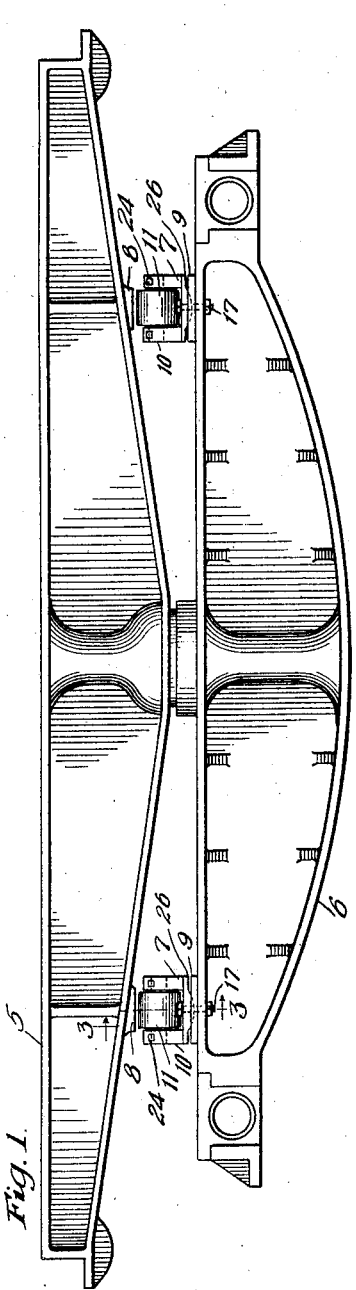
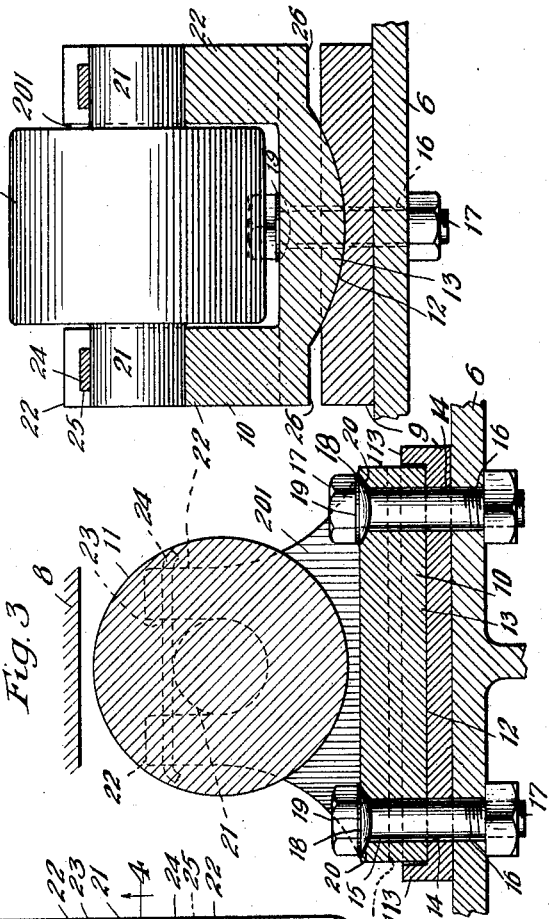
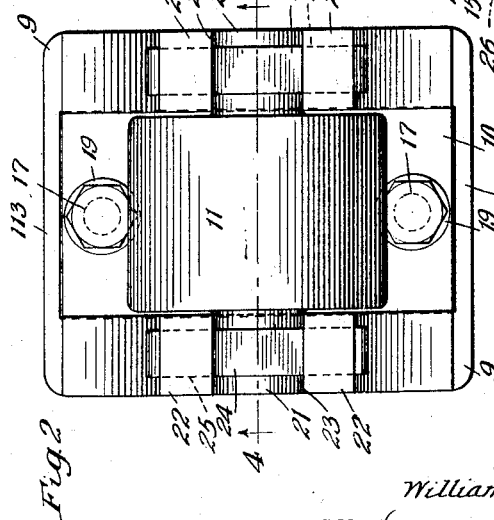
WITNESSES:
Joseph Harris
INVENTOR.
William A. Geiger
BY George J. Haight
his ATTORNEY

UNITED STATES PATENT OFFICE.

WILLIAM A. GEIGER, OF CHICAGO, ILLINOIS, ASSIGNOR TO WILLIAM H. MINER, OF CHAZY, NEW YORK.

SIDE-BEARING FOR RAILWAY-CARS.

1,387,254.  Specification of Letters Patent.  Patented Aug. 9, 1921.

Application filed October 22, 1914, Serial No. 867,988. Renewed November 18, 1916. Serial No. 132,205.

*To all whom it may concern:*

Be it known that I, WILLIAM A. GEIGER, a citizen of the United States, residing at Chicago, in the county of Cook and State of Illinois, have invented a certain new and useful Improvement in Side-Bearings for Railway-Cars, of which the following is a full, clear, concise, and exact description, reference being had to the accompanying drawings, forming a part of this specification.

My invention relates to improvements in side bearings for railway cars.

The object of my invention is to provide a side bearing of simple construction and one adapted to laterally adjust itself to the relative movements of the body and truck bolsters.

In the drawings forming a part of this specification, Figure 1 is an elevation of a body and truck bolster in assembled relation, having mounted between them side bearings embodying my invention. Fig. 2 is a plan view of my improved side bearing. Fig. 3 is an enlarged longitudinal vertical section of my improved side bearing taken on the line 3—3 of Fig. 1. Fig. 4 is a cross section taken on line 4—4 of Fig. 2.

Referring to the drawings, the numeral 5 indicates the body bolster in its normal position above a truck bolster 6. Side bearings 7—7, one on either side of the center plate, are mounted between the truck and body bolsters, one of the bolsters carrying the wear plates 8—8 and the other bolster the side bearings 7—7 associated therewith. Each side bearing 7 comprises a base member 9, a bracket 10 and a roller 11. Preferably the base member is provided with a longitudinal groove 12, the other member, preferably the bracket, being provided with a longitudinal protuberance or rib 13, the face of which is conformed to the groove 12 to permit lateral sliding engagement between the bracket and base member. The base member is provided at its ends with the upturned flanges 13 to assist in preventing longitudinal movement of the bracket 10 in reference to the base member 9 and is also provided with vertical perforations 14—14 registering with smaller perforations 15—15 in the bracket member, the said perforations being longitudinally alined upon the longitudinal axis of the base member and in preferable construction registering with perforations 16—16 in the flange of the bolster for the passage of the bolts 17—17, which are adapted to secure the members together. The bolts 17—17 are of somewhat smaller diameter than the perforations through which they pass, to permit lateral rocking of the bracket 10 on the base member 9, binding of the bolts being also prevented by the curved inner faces 18 of the washers 19 thereof, the said curved faces engaging against similarly formed faces 20 in the material surrounding the upper end of the perforations 15 in the bracket 10. The bracket 10 is provided with a longitudinal slot 201, in which the roller 11 is mounted, the roller being provided with the trunnions 21—21 journaled in the vertical arms 22—22 of the bracket and preferably within the upwardly opening slots 23—23, which may be closed by plates 24 passed through suitable perforations 25—25 in the arms 22 of the bracket 10. Extreme lateral movement of the bracket is prevented by the shoulders 26—26 at the lower ends of the arms 22 of the bracket, which limit the oscillating movement of the bracket upon the base member by engaging the upper face of the base member 9. It will be understood that upon the sway of a car body and approachment of the body bolster toward the truck bolster on one side or the other, the roller 11 will adjust itself through its lateral oscillation upon the base member 9.

I claim:

1. In a side bearing, in combination, a bracket, a roller mounted in said bracket, a base member and bolts, the base member having a longitudinal groove, the bracket having a longitudinal protuberance conformed to slide in said groove, the bracket and base member being perforated for the passage of the bolts, said perforations being of a larger diameter than the diameter of the bolts, the bracket being provided with shoulders adapted to engage the base member and limit the sliding movement of the bracket upon the base member.

2. In a side bearing for railway cars, the combination with a base member adapted to be secured to a bolster, of a bracket, a roller carried by said bracket, and means arranged to permit oscillation of said bracket on said base member, said means including a groove formed on one member and a correspondingly shaped rib on the other member, said groove and rib extending at right angles to the axis of said roller.

3. In a side bearing for railway cars, the combination with a base casting adapted to be secured to a bolster, of a bracket mounted on said base casting, said bracket carrying an anti-friction roller, said base casting having a groove concave in cross section extending lengthwise thereof and at right angles to the axis of said roller, said bracket being provided with a convexly curved rib fitting in said groove.

4. In a side bearing for railway cars, the combination with a bolster and having an upper bearing surface, of a roller-carrying member having a bottom wall and vertically extending spaced side walls, said bottom wall being provided on its under side with a bearing surface coöperable with said first named bearing surface, an anti-friction roller carried by said member and disposed between said vertical side walls, said roller having journals supported by said side walls and rotatable about a relatively fixed axis, means for holding said member in operative relation with said bolster, said bearing surfaces permitting said member to tilt in a direction at right angles to the axis of rotation of said roller.

5. In a side bearing for railway cars, the combination with a plate adapted to be secured to a bolster, said plate having a bearing surface on its upper face, of a roller-carrying member having a bottom wall and vertically extending, spaced side walls, said bottom wall being provided on its under side with a bearing surface coöperable with the bearing surface of said plate, an anti-friction roller carried by said member and disposed between said vertical side walls, said roller having journals supported by said side walls and rotatable about a relatively fixed axis, means for holding said member in operative relation with said plate, said bearing surfaces of said member and plate permitting said member to tilt in a direction at right angles to the axis of rotation of said roller.

6. In a side bearing for railway cars, the combination with a bolster provided with a bearing surface; of a roller-carrying member having vertically extending, spaced side walls and an integral connecting transverse wall, the latter being provided on its outer side with a cylindric bearing surface coöperable with said first named bearing surface; an anti-friction roller disposed between said vertical side walls, said roller having journaled support on said side walls and being rotatable about a relatively fixed axis; and means for retaining said roller-carrying member in operative position on said bolster, said coöperating bearing surfaces permitting said member to tilt in a direction at right angles to said axis of rotation of said roller.

7. In a side bearing for railway cars, the combination with a member provided with an upper bearing surface; of a roller-carrying cradle having vertically extending spaced side walls and an integral connecting bottom wall, the latter being provided on its under side with a cylindric bearing surface coöperable with said first named bearing surface; an anti-friction roller located between said vertical side walls above said bottom wall, said roller being rotatably supported from said side walls to rotate about a relatively fixed axis whereby pressure is transmitted through said roller to the side walls and from the side walls to the bottom wall and from the latter to the first named bearing surface; means for retaining said roller-carrying member in assembled relation with respect to said first named member, said coöperating bearing surfaces permitting said member to tilt in a direction at right angles to the axis of rotation of the roller.

WILLIAM A. GEIGER.

Witnesses:
 CARRIE G. RANZ,
 LUCILLE HIGGINS.